US008202914B2

(12) United States Patent
Chen et al.

(10) Patent No.: US 8,202,914 B2
(45) Date of Patent: *Jun. 19, 2012

(54) PROCESS FOR DECREASING OR ELIMINATING UNWANTED HYDROCARBON AND OXYGENATE PRODUCTS CAUSED BY FISHER TROPSCH SYNTHESIS REACTIONS IN A SYNGAS TREATMENT UNIT

(75) Inventors: Yudong Chen, Garnet Valley, PA (US); Christian Monereau, Paris (FR); Trapti Chaubey, Wilmington, DE (US); Guillaume Rodrigues, Guyancourt (FR)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,909

(22) Filed: Feb. 22, 2010

(65) Prior Publication Data
US 2011/0207836 A1    Aug. 25, 2011

(51) Int. Cl.
*C07C 27/00* (2006.01)
(52) U.S. Cl. .................. 518/700; 518/715; 518/728
(58) Field of Classification Search .................. 518/700, 518/715, 728; 252/373
See application file for complete search history.

(56) References Cited

U.S. PATENT DOCUMENTS

| 4,732,596 | A | 3/1988 | Nicholas et al. |
| 5,897,686 | A | 4/1999 | Golden et al. |
| 6,444,326 | B1 | 9/2002 | Smith |
| 6,511,760 | B1 | 1/2003 | Barone et al. |
| 7,070,833 | B2 | 7/2006 | Smith et al. |
| 7,476,246 | B2 | 1/2009 | Pathak |
| 2004/0180975 | A1 | 9/2004 | Pan et al. |
| 2005/0000354 | A1 | 1/2005 | Monereau |
| 2005/0118089 | A1 | 6/2005 | Abbott et al. |
| 2005/0165121 | A1 | 7/2005 | Wang et al. |
| 2006/0117952 | A1 | 6/2006 | Bancon et al. |
| 2007/0051238 | A1 | 3/2007 | Jain et al. |
| 2008/0020216 | A1 | 1/2008 | Bagnoli et al. |
| 2008/0244975 | A1 | 10/2008 | Johnston |
| 2008/0249196 | A1 | 10/2008 | Wentink |
| 2008/0287581 | A1 | 11/2008 | Kim et al. |
| 2009/0294103 | A1 | 12/2009 | Van Dongen et al. |
| 2010/0024641 | A1 | 2/2010 | Monereau et al. |
| 2011/0126705 | A1 | 6/2011 | Chaubey et al. |
| 2011/0127469 | A1 | 6/2011 | Chaubey et al. |

FOREIGN PATENT DOCUMENTS
EP    0903424    3/1999
(Continued)

OTHER PUBLICATIONS

PCT ISR and Written Opinion for PCT/US2010/057722, 2010.
(Continued)

*Primary Examiner* — Jafar Parsa
(74) *Attorney, Agent, or Firm* — Elwood L. Haynes

(57) ABSTRACT

The present invention provides a process for decreasing or eliminating unwanted hydrocarbon and oxygenate products caused by FTS reactions in a syngas treatment unit by utilizing heat exchangers and optionally associated pipes that are substantially fabricated of a metal material selected from the group consisting of iron, nickel, cobalt, carbon steel or stainless steel and having deposited on the metal surfaces that will come in contact with the coldbox overhead gas stream an inert coating selected from the group consisting of silicon based materials, zinc based materials, tin based materials, chromium based materials, polymers, ceramics and mixtures thereof for heating up gas streams having a mixture of hydrogen and carbon monoxide and obtained from a front end purification unit/cold box unit.

16 Claims, 1 Drawing Sheet

FOREIGN PATENT DOCUMENTS

| | | |
|---|---|---|
| EP | 1724542 | 11/2006 |
| FR | 2911289 | 7/2008 |
| WO | 2010066972 | 6/2010 |

OTHER PUBLICATIONS

Dry, M.E., "Chemical Concepts Used For Engineering Purposes", Chapter 3, In: A.P. Steinberg, M.E. Dry: "Fischer Tropsch Technology" Jan. 1, 2004, Elsevier, Amsterdam, XP002628822, ISN: 044451354X, vol. 152, pp. 196-257.

Zinc Information Center, "Application of Zinc Coatings for Iron and Steel", Copyright 2003, http://www.zincinfocentre.org/zinc applications, html, Dec. 14, 2009.

Van Der Lann, Gerard P., "Kinetics And Selectivity Of The Fischer-Tropsch Synthesis: A Literature Review", Catal. Rev., Sci. Eng., 41 (3&4), 1999, pp. 255-318.

PCT ISR and Written Opinion for PCT/US2010/057716, 2010.

PCT ISR and Written Opinion for PCT/US2011/025250, 2011.

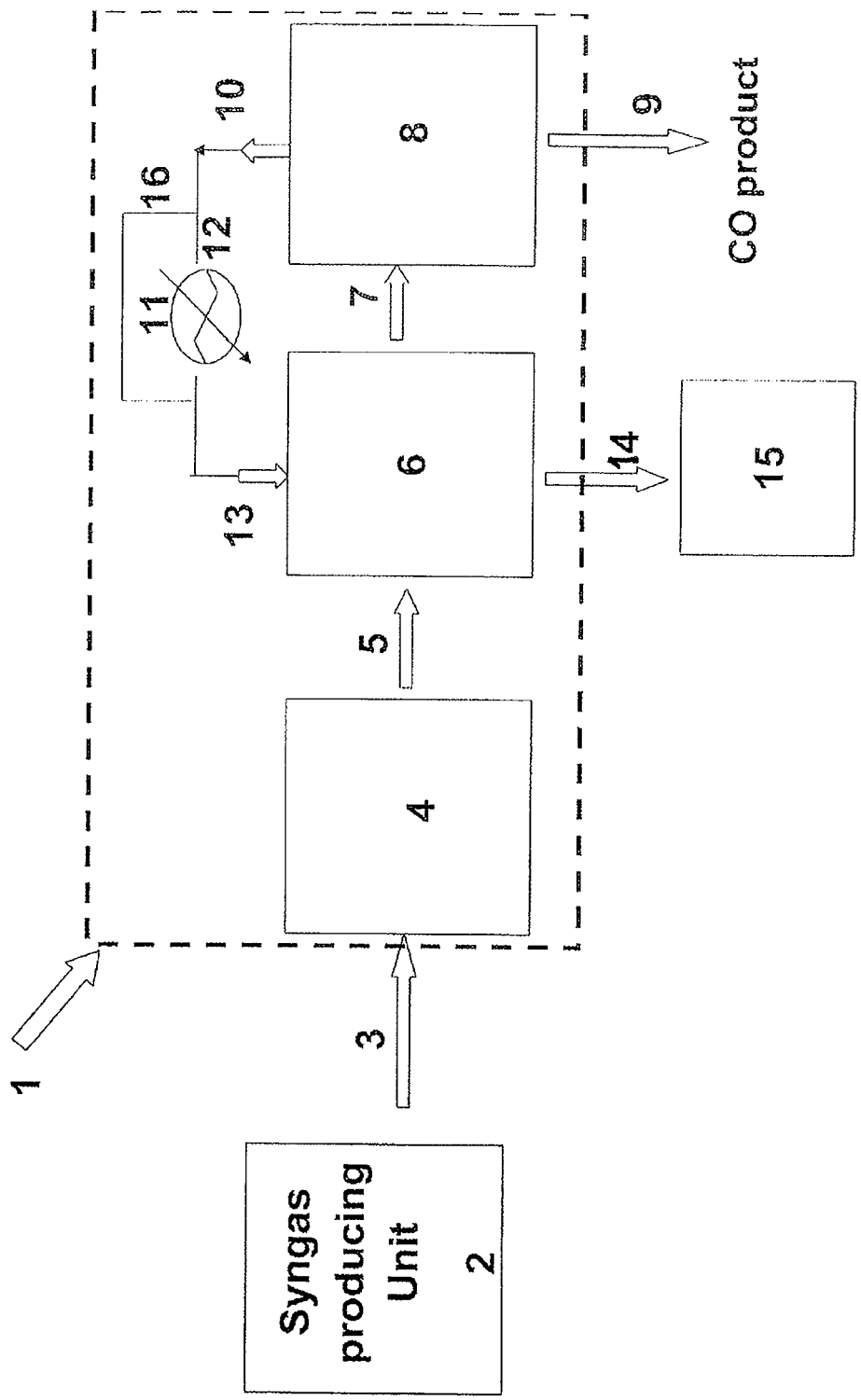

PROCESS FOR DECREASING OR ELIMINATING UNWANTED HYDROCARBON AND OXYGENATE PRODUCTS CAUSED BY FISHER TROPSCH SYNTHESIS REACTIONS IN A SYNGAS TREATMENT UNIT

FIELD OF THE INVENTION

The present invention relates to a process for decreasing or eliminating unwanted hydrocarbon and oxygenate products caused by Fischer Tropsch Synthesis reactions in a syngas treatment unit by utilizing inert coatings.

BACKGROUND

Chemical plants involve many processes and unit operations including reactions, heat recovery, purification or separation, etc. These processes can be operated at high temperatures and pressures. Syngas contains a mixture of hydrogen and carbon monoxide in various proportions as well as a variety of impurities. The syngas is produced by a number of different processes, including coal gasification, steam methane reforming, autothermal reforming or partial oxidation, etc. Syngas can be highly reactive at certain conditions thereby in certain circumstances leading to unwanted reactions which form impurities. For example, syngas is known to react at high temperature and pressure on metals surface to produce unwanted hydrocarbon and oxygenate products (the chemical compounds contain oxygen as a part of their chemical structure, such as methanol, ethanol, etc) along with water and carbon dioxide, etc. These unwanted hydrocarbon and oxygenate products can ultimately lead to wax formation which can plug the system, contaminate downstream processes, and/or create hazardous conditions in some cases. Unwanted water product from the reaction can contaminate the adsorbent materials which significantly reduces the impurities removal capability during its adsorption step in the front end purification unit. The material of fabrication for the vessels used in plants can sometimes demonstrate catalytic activity with syngas producing unwanted products or impurities. Hydrogen and carbon monoxide adsorb then dissociate on the active surface and react to form chain initiator ($CH_3$), methylene ($CH_2$) monomer and water. These hydrocarbons are formed by $CH_2$ insertion into metal-alkyl bonds and subsequent dehydrogenation or hydrogenation to an olefin or paraffin respectively. Carbon monoxide adsorbs associatively to produce alcohols. These unwanted reactions are mainly caused by Fischer Tropsch Synthesis (hereinafter "FTS"). FTS is a well-known process that is typically used to produce synthetic fuels (i.e., diesel, petrol, kerosene, etc) from syngas. Fischer Tropsch synthesis is a surface polymerization reaction producing a multi-component mixture of linear and branched hydrocarbons ultimately leading to wax formation. Water gas shift reaction can produce carbon dioxide and hydrogen from carbon monoxide and water. The FTS reactions include:

| Main reactions | |
|---|---|
| Paraffins | $(2n+1)H_2 + NcO \rightarrow C_nH_{2n+2} + nH_2O$ |
| Olefins | $2nH_2 + nCO \rightarrow C_nH_{2n} + nH_2O$ |
| WGS reaction | $CO + H_2O \Longleftrightarrow CO_2 + H_2$ |

| Main reactions | |
|---|---|
| Side reactions | |
| Alcohols | $2nH_2 + nCO \rightarrow C_nH_{2n+2}O + (n-1)H_2O$ |
| Catalyst oxidation/reduction | (a) $M_xO_y + yH_2 \Longleftrightarrow yH_2O + xM$ |
| | (b) $M_xO_y + yCO \Longleftrightarrow yCO_2 + xM$ |
| Bulk carbide formation | $yC + xM \Longleftrightarrow M_xC_y$ |
| Boudouard reaction | $2CO \rightarrow C + CO_2$ |

The result of FTS reactions in unwanted circumstances is the contamination of the downstream processes, and plugging in the lines leading to pressure build up and hazardous conditions.

Much effort has been spent on improving the catalyst performance for FTS process but little information is available on how to reduce unwanted FTS reactions. Accordingly, there is a need to provide a process for decreasing or eliminating FTS reactions in certain situations in order to minimize problems such as contamination, plugging and/or the creation of hazardous conditions.

SUMMARY OF THE INVENTION

The present invention provides a process for decreasing or eliminating unwanted hydrocarbon and oxygenate products caused by FTS reactions in a syngas treatment unit by utilizing heat exchangers and optionally associated pipes in which at least the surfaces of the heat exchanger elements of the heat exchangers that come into contact with the gas streams from the front end purification unit/cold box unit that are to be heated and the surfaces of the optionally associated pipes that come into contact with the gas streams from the front end purification unit/cold box unit that are to be heated are coated with an inert protective layer of a material selected from the group consisting of silicon based compositions, zinc based materials, tin based materials, chromium based materials, polymers, ceramics and mixtures thereof.

BRIEF DESCRIPTION OF THE FIGURE

FIG. 1 provides an overview of the equipment and flow scheme utilized in the process of the present invention.

DETAILED DESCRIPTION OF THE INVENTION

As noted above, FTS in syngas plants can often lead to the production of unwanted hydrocarbon and oxygenate products which form a waxy build up on the equipment being utilized. These unwanted hydrocarbon and oxygenate products result when the conditions within the syngas treatment unit are optimum for FTS reactions. These reactions typically take place in situations where gas streams containing hydrogen and carbon monoxide along with other possible impurities are subjected to high temperature and high pressure in the presence of active metals such as iron, nickel, and cobalt. For example, such reactions can take place with regard to gas streams produced from a front end purification unit/cold box unit which are then subjected to heat exchange in order to allow the gas stream to be recycled for further use in the front end purification unit. More specifically, when a gas stream produced by treatment in a front end purification unit is followed by condensation in a cold box and then heated to a temperature from about 100° C. to about 275° C. at a pressure of about 10 bar to about 60 bar in a heat exchanger that is substantially fabricated from iron, nickel, or cobalt, unwanted hydrocarbon and oxygenate products typically form as a result of FTS reactions. Accordingly, the present invention provides a process which decreases or eliminates these unwanted hydrocarbon and oxygenate products that are caused by FTS reactions in the syngas treatment unit.

In the process of the present invention, it is possible to further process syngas streams obtained in any variety of manners including, but not limited to, by coal gasification, by steam hydrocarbon reforming, by autothermal reforming or by partial oxidation. Accordingly, such syngas streams may be obtained in whole or in part from the treatment of hydrocarbon feedstock such as crude oil, coal or natural gas in a coal gasification unit, a steam hydrocarbon reforming unit, an autothermal reforming unit or a partial oxidation unit. The syngas stream to be treated will typically contain hydrogen and carbon monoxide as well as a variety of impurities such as, methane, carbon dioxide, sulfur containing species, water, $NO_x$, unsaturated hydrocarbons, etc. depending upon the original hydrocarbon feed utilized to produce the syngas stream.

The process of the present invention is utilized in a syngas treatment unit that comprises, at a minimum, (1) an impurities removal unit selected from an adsorption removal unit and an absorption removal unit; (2) a front end purification unit containing two or more beds of adsorbents that are selective for the removal of certain impurities, the front end purification unit operating on a cycle per adsorbent bed that includes at least an adsorption step and a regeneration step; (3) a cold box allowing for the condensation of carbon monoxide at a temperature range from about $-150°$ C. to about $-250°$ C.; (4) one or more heat exchangers operating at a temperature from about $100°$ C. to $275°$ C. and capable of being operated in a constant flow mode or a standby mode; (5) pipes that connect the one or more heat exchangers and the front end purification unit; and (6) a bypass pipe which allows for the transfer of a gas stream for cooling from the cold box either directly to the front end purification unit (bypassing the one or more heat exchangers) to be used in the regeneration step or optionally for further use elsewhere in the same unit or another unit.

The impurities removal unit utilized in the present invention can be any removal unit which is capable of removing impurities from a syngas stream. Preferably, the impurities removal unit is selected from an adsorption removal unit and an absorption removal unit. As used herein the phrase "absorption removal unit" refers to a unit that uses a liquid phase to assist in the removal of targeted impurities. The absorption removal unit can be a physical solvent removal unit such as a MDEA unit, an amine wash unit or a rectisol unit or a chemical solvent removal unit such as a unit in which zinc compounds are used for the removal of sulfur species from the gas stream. The phrase "adsorption removal unit" as used herein refers to a unit that utilizes a pressure swing adsorption unit or a thermal swing adsorption unit for the removal of impurities. Those of ordinary skill in the art will recognize that these various impurities removal units and the parameters at which the process within each may be carried out are well known in the art. Accordingly, the examples set forth herein are not meant to be limiting with regard to the present invention.

With regard to the present invention, the front end purification unit can be any front end purification unit that is known in the art that comprises two or more adsorbent beds, each adsorbent bed containing one or more adsorbents. While not wishing to be limiting, typically the one or more adsorbents utilized in the front end purification unit are selected from alumina, zeolites, silica gels and mixtures thereof. The arrangement of the adsorbents in the adsorbent beds may be in any manner that is known in the art, including, but not limited to, in a single layer, in multiple layers or as layers in a radial bed. In the most preferred embodiments of the present invention, the one or more adsorbents utilized in the front end purification unit are independently selected from zeolites in the form of molecular sieves selected from A type, Y type and X type molecular sieves. In alternative preferred embodiments of the present invention, more than one bed of adsorbent is utilized in the front end purification unit with each bed in the front end purification unit independently comprising one or more adsorbents. When more than one adsorbent is present in a particular adsorbent bed, the adsorbents within that particular adsorbent bed will preferably be present in layers.

The front end purification unit must also be of the type that will allow for operation of a cycle that includes at least an adsorption step and a regeneration step. In the adsorption step, the impurity lean gas stream from the impurities removal unit is passed over one or more beds of adsorbent that are specific for certain types of impurities. The targeted impurities are adsorbed on to the one or more adsorbents in the one or more adsorbent beds. Once the adsorbents in the beds become loaded, the adsorbent bed must be regenerated in order to allow continued removal of the impurities from the impurity lean gas stream. The regeneration step actually involves two separate phases, the first regeneration phase being heating the adsorbent bed with a hot gas in order to allow the release of the impurities from the adsorbents followed by the second regeneration phase which is quickly cooling the adsorbent bed with cold gas in order to allow the adsorbents in the adsorbent bed to once again adsorb impurities (to enter into the adsorption step). Note that if the adsorbent bed is hot, the impurities adsorption capacity to the adsorbents will be low. In addition, while the adsorbent beds of the present process will all run on a similar cycle, at least one of the adsorbent beds will be staggered in its cycle with regard to the other adsorbent bed(s) in order to allow continued uninterrupted functioning of the front end purification unit. As used herein, the term "staggered" with regard to the process carried out in the front end purification unit, typically refers to the fact that when one adsorbent bed is in the adsorption phase of the cycle, at least one of the other adsorption beds is in the regeneration phase of the cycle.

With regard to these various steps in the front end purification unit, the conditions under which they occur are known by those skilled in the art. More specially, typically the adsorption step is carried out by subjecting the gas stream to the adsorbents at a temperature from about $-70°$ C. to about $50°$ C. thereby allowing the impurities for which the adsorbents are targeted to adsorb to the adsorbents. The first regeneration phase is typically carried out at a temperature from about $100°$ C. to about $275°$ C. while the second regeneration phase is typically carried out at a temperature from about $-100°$ C. to about $50°$ C.

The cold box utilized in this process of the present invention can be any cold box unit that is known in the art. Those of ordinary skill in the art will recognize that any cold box that is capable of condensing carbon monoxide at a temperature that ranges from about $-150°$ C. to about $-250°$ C. can be utilized in the process of the present invention. Typically, such cold boxes will include condensation columns, heat exchangers, separator vessels, and distillation columns although other components may be included.

From a strictly structural standpoint, the one or more heat exchangers utilized in the present invention can also be any heat exchangers that are known in the art. More specifically, the heat exchangers will typically include at least a heat exchanger shell and one or more heat exchange elements which may be in the form of tubes, plates, fins, etc that are positioned within the shell. The heat exchangers should be capable of operating at a temperature from about 100° C. to about 275° C. and be capable of being operated either in a constant flow mode (where the gas stream is heated and passed through the one or more heat exchangers) or a standby mode (where a portion of the gas stream is passed into the one or more heated exchangers where it is heated utilizing the one or more heat exchange elements and then held within the one or more heat exchangers for a period of time until it is needed).

While the heat exchangers of the present invention may be structurally similar to what is known in the prior art, the critical aspect of the heat exchangers with regard to the process of the present invention is that an inert protective coating is applied on at least those metal parts of the heat exchange elements that will come into contact with the gas stream that is being heated. More specifically, in one embodiment, the inert protective coating will be applied to at least the metal heat exchange elements. As used herein, the phrase "heat exchange elements" refers to the active heat exchange surface of the components of the heat exchanger on which the gas is heated. Those skilled in the art will recognize that the potential of FTS reactions are greatest where the gas comes into contact with the heat exchange elements as this contact will be a direct contact. Accordingly, at least the surface of the heat exchange elements must include the inert protective coating. However, depending upon the configuration of the heat exchangers and the conditions under which the heat exchange is carried out, there may be situations where the gas may further react with the other metal surfaces within the heat exchangers, for example, with the internal walls of the heat exchanger shell due to indirect contact of this metal surface with the gas. In such situations, it is more advantageous to include the inert protective coating on every metal surface within the heat exchangers that the gas has the potential to come into contact with. Therefore, in an alternative embodiment of the present invention, the inert protective coating will be applied to all metal surfaces.

Typically, the heat exchangers utilized will be substantially fabricated of metals such as iron, nickel, cobalt, carbon steel and stainless steel or alloys of the same. As used herein, the phrase "substantially fabricated" means that all or a large portion of the heat exchangers will be made of the noted metal(s) recognizing of course that additional components of the heat exchangers may be made from other materials as is readily known to those skilled in the art. The inert coating utilized in the present invention is fabricated from a material selected from the group consisting of silicon based materials, zinc based materials, tin based materials, chromium based materials, polymers, ceramics and mixtures thereof. As used herein with regard to the present invention, the term "coating" refers to a layer of sufficient thickness of the noted material(s) which serves to cover the active metal sites on the surface of the metal parts of the heat exchanger that come into contact with the gas stream to be heated. These active metal sites on the surface of the metal parts serve as a catalyst for the FTS reaction and the coating serves to eliminate or decrease this reaction. The phrase "of sufficient thickness" refers to a layer of the material that is of a thickness that prevents the gas stream from having any contact with these active metal sites on the surface of the metal parts. Therefore, interaction of the gas stream with the active metal sites on the surface of the metal parts is decreased or eliminated when the gas stream circulated through the one or more heat exchangers or when the gas is being stored within the one or more heat exchangers. While not wishing to be limited by the range disclosed, the thickness of the inert coatings will typically range from about $0.01\mu$ (microns) to about $100\mu$, even more preferably from about $0.05\mu$ to about $50\mu$, still further from about $0.1\mu$ to about $25\mu$, and still even further from about $1.0\mu$ to about $10\mu$, although thinner and thicker thicknesses are contemplated to be within the scope of the present invention depending upon the type of inert coating utilized.

As used herein, the phrase "the metal surfaces of the heat exchange elements that come into contact with the gas stream to be heated" means that each and ever metal part of the heat exchange elements that comes into contact with the gas streams from the cold box must be coated with a protective layer of the material selected from the group consisting of silicon based compositions, zinc based materials, tin based materials, chromium based materials, polymers, ceramics and mixtures thereof as defined herein. Furthermore, as used herein, the phrase "the metal parts of the heat exchanger that come into contact with the gas stream to be heated" means that each and every metal part of the heat exchangers that comes into contact with the gas streams (whether directly or indirectly) from the cold box must be coated with a protective layer of the material selected from the group consisting of silicon based compositions, zinc based materials, tin based materials, chromium based materials, polymers, ceramics and mixtures thereof as defined herein. In the preferred embodiment, the coating in each embodiment is silicon based or polymers or mixtures thereof.

The material utilized to form the inert coating of the present invention must be a material or mixture of materials which has extended wear properties, has high temperature stability, is extremely durable and is capable to adhering to metal surfaces such as those that are utilized to fabricate heat exchangers, including the heat exchange elements, and associated pipes. More specifically, the material or mixture of materials must be similar in thermal properties to the base materials (metals) used to fabricate the heat exchangers and/or associated pipes. The reasoning for this is that the heat exchangers/pipes experience a wide range of temperatures which can result in a certain degree of expansion and contraction for the base material from which the heat exchangers/pipes are fabricated. Accordingly, the desire is to have the material or materials that form the inert coating to expand or contract to a similar degree as the base materials from which the heat exchangers/pipes are fabricated. Whenever there is a large difference in the thermal properties of the base material and inert coating used on the base material, the result could be the separation of the inert coating from the surface of the base material from which the heat exchanger/pipes are fabricated. In addition, the material utilized must be capable of performing consistently by withstanding temperatures up to about 250° C., preferably from about −50° C. to about 225° C. Also, the material utilized should be of sufficient durability to allow for the continuous interaction of the material with the gas to be heated at the temperature range noted. The reasoning behind this is that it is inconvenient, difficult and expensive to have to apply coatings on a regular basis. Accordingly, in order not to have to disrupt the processing of the syngas in the syngas treatment unit, it will be appreciated that the inert coating should be of such a thickness as to allow for continuous running of the process for a period of time of at least five (5) years, preferably at least ten (10) years, and even more preferably of at least fifteen (15) years.

As noted above, the materials contemplated for use for the inert coatings in the present invention include silicon based compositions, zinc based materials, tin based materials, chromium based materials, polymers, ceramics and mixtures thereof. As used herein, the phrase "silicon based materials" refers to silicon containing compounds that allow for the deposition of a layer of silicon or silicon derivatives on at least the part of the metal surface of the heat exchanges and/or associated pipes that come into contact with the gas stream to be heated. When the inert coating is a silicon derivative, the inert coating will generally comprise a compound that has silicon as the major component (greater than 50% silicon). Such inert coatings of silicon or silicon derivatives may be achieved by any manner that is known in the art including, but not limited to, the decomposition of a silicon hydride under particular temperatures and pressures in order to decompose the gas and consequently deposit a layer of silicon on the surface being treated. Commonly used non-limiting methods for depositing silicon based materials on the surface of metals such as iron, nickel, cobalt, carbon steel and stainless steel are known in the art and may be achieved through CVD (chemical vapor deposition) methods or PCVD (plasma chemical vapor deposition) methods such as those disclosed in U.S. Pat. No. 6,444,326, U.S. Pat. No. 6,511,760 and U.S. Pat. No. 7,070,833, each incorporated herein by reference in its entirety.

As used herein, the phrase "zinc based materials" refers to zinc containing compounds that allow for the deposition of a layer of zinc or zinc derivatives on at least the part of the metal surface of the heat exchanges and/or associated pipes that come into contact with the gas stream to be heated. When the inert coating is a zinc derivative, the inert coating will generally comprise a compound that has zinc as the major component (greater than 90% zinc).

As used herein, the phrase "tin based materials" refers to tin containing compounds that allow for the deposition of a layer of tin or tin derivatives on at least the part of the metal surface of the heat exchanges and/or associated pipes that come into contact with the gas stream to be heated. When the inert coating is a tin derivative, the inert coating will generally comprise a compound that has tin as the major component (greater than 90% tin).

As used herein, the phrase "chromium based materials" refers to chromium containing compounds that allow for the deposition of a layer of chromium or chromium derivatives on at least the part of the metal surface of the heat exchanges and/or associated pipes that come into contact with the gas stream to be heated. When the inert coating is an chromium derivative, the inert coating will generally comprise a compound that has chromium as the major component (greater than 50% chromium). Non-limited examples of compounds that may be used to deposit a layer of chromium on the metal surface of the heat exchanger/associated pipe includes, but is not limited to, chromium oxide.

As used herein, the term "polymers" refers to coating solutions that have a glass transition temperature greater than 150° C., preferably from about 150° C. to about 275° C. Non-limiting examples of suitable materials are either epoxy polymers, polyimides, polybenzimidaxoles (PBI), tetrafluoroethylenes (TEF) or polytetrafluoroethylenes (PTFE) that are deposited on at least the part of the metal surface of the one or more heat exchangers and/or associated pipes that come into contact with the gas stream to be heated. One particularly preferred embodiment includes compounds such as 4,5-difluoro-2,2-bis(trifluoromethyl)-1,3-dioxoles. Commercial examples of coating solutions which would be considered to be within the scope of the present invention include but are not limited to TEFLON AF 16008, TEFLON AF 2400®, or CHEMRAZ® or KALREZ® perfluoroelastomer. Such coatings may be prepared by contacting the metal surface to be coated with a homogenous solution comprising a polymer and an organic solvent. The solution may further be filtered prior to contact with the metal surface or may be coated by dipping or spraying the internal surface with the solution comprising the polymer and the organic solvent, which may then be dried.

As used herein, the term "ceramics" refers to either an alumina, silica or zirconia coating alone or a combination of two or more of these to form a coating. When silica or zirconia coatings are utilized, the inert coating must be a dense coating in order to prevent the gas stream brought into contact with the inert coating from penetrating the pores of the inert coating and coming into contact with the base material from which the heat exchangers/pipes are fabricated. More specifically, as used herein with regard to ceramic inert coatings of silica or zirconia or mixtures including silica and/or zirconia, the term "dense" refers to the pore size of the ceramics coating; to be considered dense, the pore size must small enough to prevent the gas from passing through the pores and coming into contact with the base material from which the heat exchangers/pipes are fabricated.

The inert coatings above can be achieved (put into place) using any manner of deposition known in the art, including, but not limited to, galvanized hot dip processes, electro-galvanized cold electrolyte processes, electroplating, thermal spray techniques, CVD, PCVD, spraying, dipping or any other method know in the art for depositing such materials as coatings on the surface of metals such as iron, nickel, cobalt, carbon steel and stainless steel, etc.

As also noted, the inert coating may comprise a mixture of two or more of the materials selected from silicon based materials, zinc based materials, tin based materials, chromium based materials, polymers and ceramics. Of these, the preferred mixtures include: zinc and chromium to give zinc chromate coatings with the ratio of zinc to chromium ranging from 5:95 to 95:5 and silicon and zinc to give zinc silicate coating with the ratio of silicon to zinc ranging from 5:95 to 95:5. As with the other individual materials, these mixtures may also be deposited in a variety of manners known in the art including, but not limited to, by galvanized hot dip processes, electro-galvanized cold electrolyte processes, electroplating, thermal spray techniques, CVD, PCVD, spraying, dipping or any other method know in the art for depositing such materials as coatings on the surface of metals such as iron, nickel, cobalt, carbon steel and stainless steel, etc.

In a still further embodiment, the inert coating will comprise two or more coatings of individual materials selected from silicon based materials, zinc based materials, tin based materials, chromium based materials, polymers and ceramics that are layered one on top of the other to form the final inert coating.

While there are a variety of pipes that connect the various components of the syngas treatment unit, the pipes that connect the one or more heat exchangers with the front end purification unit can also be critical to the process of the present invention as the syngas flowing through these pipes will in certain instances be subjected to the same conditions as when flowing through the one or more heat exchangers (high pressure and high temperature). The pipes (referred to herein as "associated pipes"), as well as at least parts of the one or more heat exchangers will generally be fabricated of a material such as iron, nickel, cobalt, carbon steel or stainless steel or alloys of one or more of the same. Accordingly, in one embodiment of the present invention, the associated pipes connecting the one or more heat exchangers and the front end purification unit are also coated on at least those surfaces that come into contact with the gas stream with a material selected from silicon based materials, zinc based materials, tin base materials, chromium based materials, polymers, ceramics and mixtures thereof as defined hereinbefore. In one preferred embodiment, the same material used to form the inert coatings for the one or more heat exchangers will also be used to form the inert coatings for at least the internal surfaces of the associated pipes connecting the one or more heat exchangers with the front end purification unit. As with the one or more heat exchangers, the inert coatings for the associated pipes may be deposited in any manner that is known in the art, including CVD, PCVD, dipping and spraying.

In addition to the associated pipes that connect the one or more heat exchangers with the front end purification unit, the syngas treatment unit will also comprise a bypass pipe which allows for the transfer of the gas stream from the cold box either directly to the front end purification unit where it will be used to regenerate the adsorbent beds or optionally this bypass pipe can be used to transfer the gas stream for further use elsewhere in the process.

In a still further embodiment of the present invention, the interior surfaces of the front end purification unit will also have an inert coating applied to those surfaces that will come into contact with the heated gas streams from the heat exchangers/associated pipes. Since many front end purification units are constructed of materials which demonstrate catalytic activity under certain conditions when brought into contact with hot syngas, such as carbon steel, it may also be advantageous to also include a coating on the interior surfaces of the front end purification unit, including the beds prior to being loaded with adsorbent, to eliminate or minimize such reactions. Gas streams received by the front end purification unit from the heat exchangers, while being less susceptible to FTS, may none the less undergo a lesser degree of such reaction than seen in the heat exchangers. Accordingly, depending upon the actual conditions, it may be desirable to include such an inert coating as described hereinbefore on the interior surface of the front end purification unit as a precaution.

FIG. 1 provides an overview of the process of the present invention. With regard to this process, the first step involves providing a syngas treatment unit (1) as described hereinbefore. A syngas stream from a syngas producing unit (2) is introduced via line (3) into the impurities removal unit (4) of the syngas treatment unit (1). As noted above, the syngas stream introduced via line (3) will typically contain hydrogen and carbon monoxide as well as a variety of impurities such as methane, carbon dioxide, sulfur containing species, $NO_x$, unsaturated hydrocarbons and water. The syngas stream is introduced into the impurities removal unit (4) in an effort to remove a large portion of these impurities from the syngas stream thereby producing an impurity lean gas stream. The impurity lean gas stream will typically have the same general makeup as the syngas stream but with a reduced level of the original impurities. Note however that small amounts of additional impurities may be present in the impurity lean gas stream due to the solvent being used in the bulk removal process in the impurities removal unit (4). The objective of the impurities removal unit step in the process is to reduce the level of impurities from the syngas stream at this point in the process to minimize physical or safety issues that may present themselves downstream when gas streams that contain these types of impurities are injected into the cold box. As noted previously, those skilled in the art recognize that issues such as clogging and/or actual explosions may result due to the injection of gas streams that contain high levels of these impurities. With regard to this impurities removal unit step, preferably from about 80% to about 99% of the targeted impurities are removed.

In the next step of the process of the present invention, the impurity lean gas stream is withdrawn from the impurities removal unit (4) via line (5) and is then introduced into the front end purification unit (6) as described hereinbefore. The impurity lean gas stream is introduced during the adsorption step of the front end purification unit cycle. This step of the process is carried out in order to further reduce the impurities which present physical or safety issues downstream in the cold box (8) from the impurity lean syngas stream by using adsorbents in beds (not shown) that are selective for these impurities. Accordingly, the impurity lean gas stream is injected into the front end purification unit (6) under conditions that are known to those skilled in the art in order to promote the adsorption of the targeted impurities onto the one or more adsorbents contained in the one or more beds of the front end purification unit (6). As a result of passing the impurity lean gas stream over the one or more adsorbent beds, the targeted impurities within the impurity lean gas stream are adsorbed to the adsorbents thereby leaving the remaining portion of the impurity lean gas stream to form a purified syngas stream which will typically comprise at least hydrogen and carbon monoxide.

The purified syngas stream is then withdrawn from the front end purification unit (6) via line (7) and introduced into the cold box (8) as described hereinbefore. Once the purified syngas stream is introduced into the cold box (8), the carbon monoxide in the purified syngas stream is condensed at a temperature from about −180° C. to about −250° C. to form a pure carbon monoxide condensed stream which is removed via line (9) from the cold box (8) as carbon monoxide product. The remaining components form an overhead stream which contains mostly hydrogen with small amounts of carbon monoxide and possible trace impurities.

In the next step of the process, the resulting overhead stream is withdrawn from the cold box (8) via line (10) and is utilized in one of two manners. The first manner involves heating the coldbox overhead stream to be used to regenerate the adsorbent beds of the front end purification unit (6). Accordingly, in this option, the coldbox overhead gas stream is introduced into the one or more heat exchangers (11) that are in the constant flow mode in order to heat up the gas. The heat exchangers (11) utilized in this step include an inert coating on at least the heat exchange elements or optionally on every metal surface that is to come into contact with the coldbox overhead gas stream. This inert coating is fabricated of a material selected from the group consisting of silicon based materials, zinc based materials, tin based materials, chromium based materials, polymers, ceramics and mixtures thereof as defined hereinbefore. As noted, the material that the heat exchangers are fabricated from can be any variety of materials such as iron, nickel, cobalt, carbon steel and stainless steel, as well as alloys of any one or more of these.

With regard to each of the above noted alternatives, the coldbox overhead gas stream is introduced from lines (10) and (12) into the one or more heat exchangers (11) fabricated of the noted material where the coldbox overhead gas stream is heated to the desired temperature as it passes through the one or more heat exchangers by coming into contact with the heat exchange elements that include the inert coatings as defined hereinbefore. As noted, other metal surfaces in the heat exchangers may also include an inert protective coating. The amount of gas flow through the one or more heat exchanges will be dependent upon the size of the cold box unit, but will typically be less than about 40% of the total amount of feed stream entering the cold box unit, in a second alternative less than about 30% of the total amount of feed stream entering the cold box unit and in a still further embodiment, less than about 15% of the total amount of feed stream entering the cold box unit. In one alternative, the heated coldbox overhead gas stream flows through the one or more heat exchangers that include the inert coatings as defined hereinbefore and is sent directly to the front end purification unit (6) via line (13) where it is used as the "hot gas" in the first phase of the regeneration step for the adsorbent beds. In another alternative, a portion of the heated coldbox overhead gas stream is retained in the one or more heat exchangers that include the inert coatings as defined hereinbefore for a period of time until the gas stream is to be used.

When the heated coldbox overhead gas stream is passed to the front end purification unit, it heats the adsorbent beds, thereby allowing the impurities adsorbed to the adsorbents in the adsorbent beds to be released. As a result, the first phase of the regeneration step is completed. These released impurities form an adsorbent impurity stream which is passed on via line (14) for further treatment in a process unit (15) such as in a hydrogen pressure swing adsorption unit or to be used as a feed upstream.

Note that when the adsorbent bed of the front end purification unit (6) is in the first phase of the regeneration step of the front end purification unit cycle, the heat exchangers (11) will be in the constant flow mode as the need for hot gas is continuous. However, when the cycle goes to the second phase of the regeneration step of the front end purification unit cycle, there is no need for hot gas but is instead a need for a cooling gas. In this particular part of the cycle, the heat exchangers (11) are switched off line to the stand by mode, the portion of coldbox overhead gas that is in the one or more heat exchangers (11) is retained in the one or more heat exchangers unit, and the unheated coldbox overhead gas stream from the cold box (8) is instead rerouted through the bypass line (16) and line (13) to the front end purification unit (6) to be used as the cooling gas for this second phase of the regeneration step. In this instance as the need is for a cooling gas, the coldbox overhead gas stream is used directly from the cold box (8) without the necessity of heating as the cold state of the gas is beneficial to the rapid cooling of the adsorbent beds in the front end purification unit (6). While not depicted in the present figure, in a still further embodiment of the present invention, the unheated coldbox overhead gas stream from the cold box (8) can instead be rerouted directly to the hydrogen pressure swing adsorption unit (15) for use. As the front end purification unit (6) contains two or more adsorbent beds, the flow of coldbox overhead gas from either the cold box (8) or the heat exchangers (11) is continuous as one of the adsorbent beds is typically always being regenerated when the syngas unit is running. As noted previously, in order to not experience down time with regard the syngas treatment unit, the cycles with regard to the beds are staggered. With regard to adsorbent beds that are in the regeneration step of the front end purification unit cycle, when the bed is in the first phase of the regeneration step, the one or more heat exchangers are in the constant flow mode thereby supplying the necessary hot gas for the release of impurities from the adsorbent bed. However, when the bed is in the second phase of the regeneration step, the one or more heat exchangers are in the stand by mode as there is no need for the hot gas at this point. At this point, the gas from the cold box bypasses the one or more heat exchangers and is injected directly into the front end purification unit to allow for cooling of the beds that are in the second phase of the regeneration step. Accordingly, with regard to the present process, at least one of the adsorbent beds is in the regeneration step of the cycle while at least one of the beds is in the adsorption step of the cycle.

The present invention further provides an additional process in which unwanted hydrocarbon and oxygenate products that interfere with downstream processes and are caused by FTS reactions in a syngas stream are decreased or eliminated. This process is applicable to syngas streams that contain at least hydrogen and carbon monoxide and that are subjected to temperature conditions from about 100° C. to about 275° C. and pressure conditions from about 10 bar to about 60 bar. In this process, the equipment where the syngas is being subjected to these pressure and temperature conditions is coated with an inert material that is selected from silicon based materials, zinc based materials, tin based materials, chromium based materials, polymers, ceramics and mixtures thereof as defined hereinbefore.

EXAMPLES

Experiments were carried out to study Fischer Tropsch Synthesis reaction kinetics in syngas treatment units by passing mixtures of hydrogen ($H_2$) and carbon monoxide (CO) in the form of coldbox overhead gas streams at a high pressure of 26 bars and at different temperatures (150° C., 200° C. and 250° C.) into carbon steel tubes that have been coated on the internal surfaces with silicon based materials to determine if exposure of these materials to the $H_2$/CO mixture resulted in FTS reactions on the inner surface of the tube to give unwanted hydrocarbon and oxygenate products. The tubes utilized had a one inch outer diameter and a sixteen and a half inch length (1" OD×16.5" L). The inert coatings utilized were commercially available silicon coatings from Restek Corp. which are sold under the names Siltek Coatings and Silicosteel Coatings and were deposited on the internal surface of the tubes utilizing a chemical vapor deposition process. In addition, for purposes of comparison, two comparative examples are included which are outside of the scope of the present invention. These coatings include a nickel coating and a manganese coating and were deposited on the internal surface of the tubes utilizing a chemical vapor deposition process The examples noted below were carried out using the above noted coated tubes. Each of the materials was tested by using a tube of the dimensions noted above fabricated of the noted material. Each tube was then subjected to a pressure of approximately 26 bar and a series of temperatures while the $H_2$/CO mixture was allowed to either flow through the tube (depicting the flow mode of the heat exchangers) or allowed to remain in the tube for a period of time (depicting the stand-by mode of the heat exchangers).

In the experiments carried out, the tubes were first subjected to a temperature of 250° C. and the gas sample was allowed to flow through at a rate to give a total contact time of approximately 2.9 seconds. During the flow mode of each of these examples, samples were analyzed for carbon content as the gas exited the tube. Once it was determined that the carbon content in the removed samples was stable, a final reading was taken and the tube was closed thereby encapsulating the gas mixture within the tube to depict the stand-by mode for the heat exchangers. This was accomplished by trapping the gas at high pressure and closing the valve upstream and downstream of the reactor and leaving the gas in the tube for a total of 18 hours (64,800 seconds). A sample was analyzed downstream of the reactor after 18 hours. The temperature was then lowered to 200° C. and the process repeated. A total of three cycles were carried out for each tube in this manner: one at 250° C., one at 200° C. and one at 150° C.

The sequence of the testing for each tube was:
First cycle: 26 bar, 250° C. Flow Mode followed by Stand-by Mode
Second cycle: 26 bar, 200° C. Flow Mode followed by Stand-by Mode
Third cycle: 26 bar, 150° C. Flow Mode followed by Stand-by Mode On average, depending on the total number of cycles and the flow mode/standby mode, each tube was tested for more than 300 hours and the results were reproduced using multiple numbers of tubes. During the flow mode, the gas was passed at a flow rate to allow approximately 2.9 seconds of contact time of the gas with the tube inner surface. The contact time was calculated based on volumetric flow rate to volume of the reactor ratio. The sample was continuously analyzed downstream using Gas Chromatography and FTIR analyzer to determine carbon content. FTS can produce wide range of products with very wide range of molecular weight or chain length. The products from Fischer Tropsch synthesis involve paraffins, olefins, alcohols, water and carbon dioxide ultimately leading to wax formation. It can also produce ketones, aldehydes, ethers as by products. Gas Chromatography with Flame Ionization detector was used to analyze tube outlet sample stream for paraffins ($C_1$-$C_5$), olefins ($C_2$-$C_5$) and alcohols ($C_1$-$C_2$). Fourier Transform Infrared (FTIR) was added to the gas exhaust line to measure carbon monoxide, carbon dioxide and water in order to conduct carbon balance. Fischer Tropsch product formation was converted to carbon content in product as shown below:

Carbon content in products (ppm)=concentration of Methane+2× concentration of Ethane+3× concentration of n-Propane+4× concentration of n-butane+5×concentration of n-pentane+2× concentration of Ethylene+3× concentration of 1-Propylene+4× concentration of 1-butene+5× concentration of 1-pentene+ concentration of Methanol+2× concentration of Ethanol+ . . . .

Note that FTS reactions follow the Arrhenius equation and increase exponentially with increase in temperature.

The table below provides the results obtained with regard to contacting $H_2$/CO gas mixture having a carbon monoxide partial pressure of 0.13 bar with carbon steel coated tubes at a pressure of approximately 26 bar and at varying temperatures for the times noted. The comparative examples were treated in the same manner as the examples of the present invention.

As can be seen from this table, contact of the $H_2$/CO gas mixture with carbon steel tubes having a silicon coating resulted in no or very little FTS reactions for Coatings 1 and 2 at the lower temperatures and a reduction of at least 50% from the non-treated tube (carbon steel without a coating) at the higher temperature (250° C.). With regard to the comparative examples, in the case of the nickel coating, the FTS reaction was reduced by more than 50% but only when the temperature was less than 200° C. The surface became active at 250° C., possibly due to the coating becoming more porous at the higher temperature. With regard to the manganese coating, the surface was active at all temperatures and did not reduce the reaction compared to the base metal, carbon steel.

ELEMENTS OF THE FIGURES

1—syngas treatment unit
2—syngas producing unit
3—line for introducing syngas from the syngas producing unit into the impurities removal unit
4—impurities removal unit
5—line for introducing the impurity lean gas stream from the impurities removal unit into the front end purification unit
6—front end purification unit
7—line for introducing the purified syngas stream from the front end purification unit into the cold box
8—cold box
9—line for removing pure carbon monoxide product from the cold box
10—line for introducing coldbox overhead gas stream from the cold box to one of two options
11—one or more heat exchangers
12—line introducing coldbox overhead gas stream from line 10 into the one or more heat exchangers
13—line for introducing heated coldbox overhead gas stream from the one or more heat exchangers into the front end purification unit
14—line for introducing adsorbent impurity stream from the front end purification unit to the process unit
15—process unit
16—bypass line

What is claimed is:

1. A process for decreasing or eliminating unwanted hydrocarbon and oxygenate products caused by Fisher Tropsch Synthesis reactions in a gas stream comprising a hydrogen

TABLE 1

| | | | | Carbon content in product (ppm) | | | | |
|---|---|---|---|---|---|---|---|---|
| Gas Composition | Temperature (° C.) | CO partial pressure (bar) | Contact time (sec) | Carbon Steel | Coating 1 (Siltek Coating) | Coating 2 (Silico-steel coating) | Coating 3 (Ni coating) | Coating 4 (Mn coating) |
| 0.5% CO in H2 | 150 | 0.13 | 2.9 | 2 | 0 | 0 | 1 | 2 |
| 0.5% CO in H2 | 150 | 0.13 | 64800 | 210 | 0 | 26 | 20 | — |
| 0.5% CO in H2 | 200 | 0.13 | 2.9 | 28 | 4 | 3 | 8 | 34 |
| 0.5% CO in H2 | 200 | 0.13 | 64800 | 2014 | 286 | 530 | 606 | 2176– |
| 0.5% CO in H2 | 250 | 0.13 | 2.9 | 176 | 75 | 20 | 282 | 303 |
| 0.5% CO in H2 | 250 | 0.13 | 64800 | 4420 | 2684 | 2594 | 4809 | — | and carbon monoxide mixture and produced in a syngas treatment unit, said process comprising the steps of
- A. providing a syngas treatment unit that comprises
  - a) an impurities removal unit selected from an adsorption removal unit and an absorption removal unit;
  - b) a front end purification unit containing one or more beds of adsorbents selective for the removal of impurities, the front end purification unit operating on a cycle that includes at least an adsorption step and a regeneration step;
  - c) a cold box allowing for the condensation of CO at a temperature range from about −150° C. to about −250° C.;
  - d) one or more heat exchangers comprising at least one or more heat exchange elements positioned within a heat exchanger shell, operating at a temperature from about 100° C. to 275° C. and capable of being operated in a constant flow mode or a standby mode;
  - e) pipes that connect the one or more heat exchangers and the front end purification unit; and
  - f) a bypass pipe which allows for the transfer of a cooling stream from the cold box either directly to the front end purification unit or optionally for further use;
- B. introducing a syngas stream containing hydrogen, carbon monoxide, methane and a variety of impurities into the impurities removal unit in order to remove a large portion of the impurities which present physical or safety issues downstream in the cold box from the syngas stream thereby producing an impurity lean syngas stream;
- C. withdrawing the impurity lean syngas stream from the impurities removal unit and introducing the impurity lean syngas stream into the front end purification unit during the adsorption step of the front end purification unit cycle in order to further remove impurities which present physical or safety issues downstream in the cold box from the impurity lean syngas stream by adsorbing the impurities on to the one or more adsorbents contained in the beds of the front end purification unit thereby producing a purified syngas stream;
- D. withdrawing the purified syngas stream from the front end purification unit and introducing the purified syngas stream into the cold box wherein the carbon monoxide in the purified syngas stream is condensed at a temperature from about −180° C. to about −250° C. to form a pure carbon monoxide stream and the remaining components of the purified syngas stream form a coldbox overhead gas stream;
- E. removing the pure carbon monoxide stream from the cold box as carbon monoxide product; and
- F. withdrawing the coldbox overhead gas stream from the cold box and either:
  - i. introducing the coldbox overhead gas stream into the one or more heat exchangers that are in the constant flow mode during the regeneration step of the front end purification unit cycle in order to heat the coldbox overhead gas stream to a temperature from about 100° C. to about 275° C. and then recycling the heated coldbox overhead gas stream to the front end purification unit through the use of an associated pipe to be used for the regeneration of the adsorbents in the beds of the front end purification unit thereby producing an adsorbent impurity stream that is passed on for further treatment or as a feed upstream in the process, the one or more heat exchangers being substantially fabricated of a material selected from iron, nickel, cobalt, carbon steel or stainless steel and having deposited on at least the metal surfaces of the heat exchange elements that will come in contact with the coldbox overhead gas stream an inert coating selected from the group consisting of silicon based materials, zinc based materials, tin based materials, chromium based materials, polymers, ceramics and mixtures thereof,
  - ii. bypassing the one or more heat exchangers by passing the coldbox overhead gas stream through the bypass line and introducing the unheated coldbox overhead gas stream into the front end purification unit to be used to cool down the regenerated adsorbent beds prior to the front end purification unit cycle being switched to the adsorption cycle while retaining a portion of coldbox overhead gas in the one or more heat exchangers that are in the standby mode.

2. The process of claim 1, wherein the inert coating is a silicon based coating.

3. The process of claim 2, wherein the one or more heat exchange elements are substantially fabricated from a material selected from the group consisting of iron, nickel or carbon steel.

4. The process of claim 2, wherein the one or more heat exchangers are substantially fabricated from a material selected from the group consisting of iron, nickel or carbon steel.

5. The process of claim 3, wherein the associated pipes connecting the one or more heat exchangers and the front end purification unit are also fabricated from iron, nickel or carbon steel and also include a silicon based coating on the surfaces that come into contact with the coldbox overhead gas stream.

6. The process of claim 1, wherein the syngas treated is produced using a coal gasification unit, a steam hydrocarbon reforming unit, an autothermal reforming unit or a partial oxidation unit.

7. The process of claim 1, wherein the impurities removal unit is an absorption removal unit selected from a physical solvent removal unit and a chemical solvent removal unit.

8. The process of claim 1, wherein the one or more adsorbents utilized in the front end purification unit are selected from alumina, zeolites, silica gels and mixtures thereof.

9. The process of claim 8, wherein the one or more adsorbents utilized in the front end purification unit are independently selected from zeolites in the form of molecular sieves selected from A type, Y type and X type molecular sieves.

10. The process of claim 8, wherein the one or more adsorbents utilized in the front end purification unit are present in one or more beds within the front end purification unit.

11. The process of claim 8, wherein when more than one adsorbent is utilized in the adsorbent beds, the adsorbents are present in layers within each adsorbent bed.

12. The process of claim 1, wherein the front end purification unit is substantially fabricated of a material selected from iron, nickel, cobalt, carbon steel or stainless steel and has deposited on at least the surfaces that will come in contact with the heated coldbox overhead gas stream an inert coating selected from the group consisting of silicon based materials, zinc based materials, tin based materials, chromium based materials, polymers, ceramics and mixtures thereof.

13. A process for decreasing unwanted hydrocarbon and oxygenate products that interfere with downstream processes and are caused by Fisher Tropsch Synthesis reactions in a syngas stream containing at least hydrogen and carbon monoxide, when the syngas is subjected to a temperature conditions from about 100° C. to about 275° C. and pressure conditions from about 10 bar to about 60 bar, the process comprising providing equipment where the syngas is being subjected to these pressure and temperature conditions, the equipment being substantially fabricated from materials consisting of iron, nickel, cobalt, carbon steel or stainless steel and alloys of one or more of these and having deposited on the metal surfaces that will come in contact with the syngas stream an inert coating selected from the group consisting of silicon based materials, zinc based materials, tin based materials, chromium based materials, polymers, ceramics and mixtures thereof.

14. The process of claim 13, wherein the inert coating is a silicon based coating.

15. The process of claim 14, wherein when the equipment is substantially fabricated from the group consisting of iron, nickel or carbon steel.

16. The process of claim 13, wherein the syngas treated is produced using a coal gasification unit, a steam hydrocarbon reforming unit, an autothermal reforming unit or a partial oxidation unit.

* * * * *